United States Patent [19]

Kalfoglou

[11] 4,269,270

[45] * May 26, 1981

[54] SULFOMETHYLATED LIGNOSULFONATES AS ADDITIVES IN OIL RECOVERY PROCESSES INVOLVING CHEMICAL RECOVERY AGENTS

[75] Inventor: George Kalfoglou, Houston, Tex.

[73] Assignee: Texaco Inc., White Plains, N.Y.

[ * ] Notice: The portion of the term of this patent subsequent to Oct. 30, 1996, has been disclaimed.

[21] Appl. No.: 54,773

[22] Filed: Jul. 5, 1979

Related U.S. Application Data

[63] Continuation-in-part of Ser. No. 901,365, Apr. 28, 1978, Pat. No. 4,172,498, and Ser. No. 745,494, Nov. 26, 1976, abandoned, which is a continuation-in-part of Ser. No. 715,957, Aug. 19, 1976, abandoned, and Ser. No. 591,573, Jun. 30, 1975, abandoned, and Ser. No. 591,574, Jun. 30, 1975, Pat. No. 4,006,779.

[51] Int. Cl.³ .............................................. E21B 43/22
[52] U.S. Cl. .................................. 166/273; 166/274; 252/8.55 D
[58] Field of Search ................... 252/8.55 D; 166/273, 166/274, 275

[56] References Cited

U.S. PATENT DOCUMENTS

| | | | |
|---|---|---|---|
| 3,532,166 | 10/1970 | Williams | 166/274 |
| 3,700,031 | 10/1972 | Germer et al. | 166/274 |
| 3,777,817 | 12/1973 | Feuerbacher et al. | 166/274 |
| 3,797,574 | 3/1974 | Feuerbacher et al. | 166/275 X |
| 4,088,640 | 5/1978 | Detroit | 260/124 |
| 4,172,498 | 10/1979 | Kalfoglou | 252/8.55 X |

*Primary Examiner*—Herbert B. Guynn
*Attorney, Agent, or Firm*—Carl G. Ries; Robert A. Kulason; Kenneth R. Priem

[57] ABSTRACT

A process for producing petroleum from subterranean formations is disclosed wherein production from the formation is obtained by driving a fluid from an injection well to a production well. The process involves injecting via the injection well into the formation an aqueous solution of sulfomethylated lignosulfonate salt as a sacrificial agent to inhibit the deposition of surfactant and/or polymer on the reservoir matrix. The process may best be carried out by injecting the sulfomethylated lignosulfonates into the formation through the injection well mixed with either a polymer, a surfactant solution and/or a micellar dispersion. This mixture would then be followed by a drive fluid such as water to push the chemicals to the production well.

4 Claims, No Drawings

4,269,270

SULFOMETHYLATED LIGNOSULFONATES AS ADDITIVES IN OIL RECOVERY PROCESSES INVOLVING CHEMICAL RECOVERY AGENTS

This application is a continuation-in-part of copending application, Ser. No. 901,365 filed Apr. 28, 1978, now U.S. Pat. No. 4,172,498 application, Ser. No. 745,494, filed Nov. 26, 1976, now abandoned, which is a continuation-in-part of copending application, Ser. No. 715,957, filed Aug. 19, 1976 and application Ser. No. 591,573, filed June 30, 1975, both now abandoned and copending application Ser. No. 591,574 filed June 30, 1975 now U.S. Pat. No. 4,006,779.

BACKGROUND OF THE INVENTION

1. Field of the Invention

This invention relates to the recovery of oil from subterranean formations by chemical flooding methods.

2. Description of the Prior Art

Petroleum is frequently recovered from subterranean formations or reservoirs by permitting the natural energy of the reservoir to push the pertroleum up through wells to the surface of the earth. These processes are referred to as primary recovery methods since they use the natural energy of the reservoir. However, a large amount of oil, generally in the range of 65-90% or more, is left in the subterranean formation at the conclusion of the primary recovery program. When the natural reservoir energy is unable to produce more petroleum, it is a common practice to resort to some form of supplemental recovery technique in order to recover additional petroleum left in the subterranean formation. These supplemental operations are normally referred to as secondary recovery operations. If this supplemental recovery operation is the second in a series of such operations, it will be referred to as a tertiary recovery operation. However, the terminology is unimportant for the purposes of this application and relates only to the sequence in which they are carried out.

The most widely used supplemental recovery technique because of its ease of implementation and low capital outlay is water flooding through injection wells drilled into the subterranean formation. In a water flooding operation, the injected fluid displaces oil through the formation to be produced from the injection well. A major disadvantage to water flooding, however, is its relatively poor displacement efficiency largely due to the fact that water and oil are immiscible at reservoir conditions and high interfacial tension exists between the flood water and the oil. For this reason, after a water flood, a large portion of the oil is still left unrecovered in the reservoir.

It has been recognized by those skilled in the art that a solution effecting a reduction in this interfacial tension between water and oil would provide a much more efficient recovery mechanism. Therefore, the inclusion of a surface active agent or surfactant in the flood water was recognized as an acceptable techinque for promoting displacement efficiency of the reservoir oil by the water. For example, U.S. Pat. No. 3,468,377 discloses the use of petroleum sulfonates in water flooding operations and U.S. Pat. No. 3,553,130 discloses the use of ethylene oxide adducts of alkyl phenols for the same purpose. The use in water flooding operations of water soluble surface active alkaline earth resistant polyglycol ethers is disclosed in U.S. Pat. No. 2,233,381. Other specialized surfactants, as will be discussed later, have been discovered to have special properties useful in water flooding operations such as a tolerance for high salinity and calcium, and/or magnesium ion concentrations often found in reservoir waters.

However, field operations employing surfactants and surface active agents in injected fluid have not always been entirely satisfactory due to the fact that these materials are often adsorbed by the formation rock to a relatively high degree, resulting in an ever declining concentration of the materials as they progress through the reservoir. Therefore, large concentrations of surface active materials have heretofore been necessary to maintain a sufficient concentration at the oil-water interface. Due to this, many proposed flooding operations involving surface active materials have been uneconomical.

Another serious problem for any recovery technique involving the driving of oil with a fluid is premature breakthrough of the injection fluid. This premature breakthrough indicates that the reservoir has not been adequately swept of oil. The problem is often described in terms of sweep efficiency as distinguished from the displacement efficiency described above. Displacement efficiency involves a microscopic pore by pore efficiency by which water displaces oil, whereas sweep efficiency is related to the portion of the reservoir which is swept and unswept by the injected fluid. A major cause of poor sweep efficiency is associated with the fact that the injected fluid generally has a lower viscosity than the displaced fluid (petroleum). Thus, the injected fluid has a higher mobility and tends to finger through the oil, prematurely breaking through to the production well.

One solution to this high mobility problem is to increase the viscosity of the driving fluid. A way to do this is to add polymeric organic materials to a driving water which has the effect of increasing the viscosity of the water, thereby increasing the sweep efficiency of the supplemental recovery process. U.S. Pat. No. 3,039,529 and U.S. Pat. No. 3,282,337 teach the use of aqueous polyacrylamide solutions to increase the viscosity of the injected fluid thereby promoting increase sweep efficiency. Polysaccharides as taught in U.S. Pat. No. 3,581,824 have been used for the same purpose. These polymers are quite expensive and any polymer lost to adsorption on the reservoir matrix adds substantially to the cost since additional polymer is required to maintain a given viscosity.

The above described problems have been recognized by those skilled in the art of oil recovery and certain sacrificial compounds have been added to pretreat the formation in order to decrease the adsorption of subsequently injected surfactants and/or polymers. For example, U.S. Pat. No. 3,414,054 discloses the use of aqueous solutions of pyridine; U.S. Pat. No. 3,469,630 discloses the use of sodium carbonate and inorganic polyphosphates, and U.S. Pat. No. 3,437,141 discloses the use of soluble carbonates, inorganic polyphosphates and sodium borate in combination with saline solution of a surfactant having both a high and a low molecular weight component. These materials have not been completely satisfactory from a standpoint of performance and economics however.

SUMMARY OF THE INVENTION

The invention is a process of producing petroleum from subterranean formation having an injection well and a production well in communication therewith. The process comprises injecting into the formation via the injection well an aqueous solution of sulfomethylated lignosulfonate salts in conjunction with a chemical oil recovery agent, for example, surfactant, polymer and/or a micellar dispersion thereby displacing oil from the subterranean formation to the surface of the earth. In a particularly preferred embodiment of this invention an aqueous solution of sulfomethylated lignosulfonate salts is injected into a formation in conjunction with a polymeric material.

DESCRIPTION OF THE PREFERRED EMBODIMENTS

A sacrificial material is injected by the process of this invention through an injection means comprising one or more injection wells into a subterranean petroleum-containing formation to preferably occupy or cover all potential adsorption sites of the rock within the subterranean formation thereby reducing the extent of adsorption of the more expensive chemical oil recovery agent injected therewith. A sacrificial agent performs best when it exhibits high adsorption on active sites of rock surfaces, and thus diminishes surfactant and/or polymer adsorption. Chemical compounds of polyelectrolytic nature have the proper physico chemical and structural requirements to behave as successful sacrificial agents. The functional group on the sacrificial agent molecules enhances adsorption either by hydrogen bonding or electrostatic attraction to active sites on the rock surfaces.

A satisfactory sacrificial material has at least three important characteristics. First, it should be less expensive than the polymer or surfactant on a cost effectiveness basis since it is to be sacrificed or adsorbed by the formation, probably not to be recovered. Next, it must be adsorbed readily by the subterranean formation matrix. Preferably the sacrificial material should be adsorbed more readily than the chemical oil recovery agent to be used in the process. The third important characteristic of a sacrificial agent is that the presence of such adsorbed sacrificial material should retard or eliminate adsorption of the surfactant and/or polymer chemical recovery material on the adsorption sites of the formation rock. By adsorption sites of the formation rock it is meant those parts of the surfaces of the pores of the formation rock capable of adsorbing a chemical compound from a solution on contact.

The sacrificial material may not have a detrimental effect on the recovery efficiency of the chemical flooding operation. Additional oil is usually recovered only if the sacrificial material is followed by or is admixed with a surfactant and/or a polymer chemical recovery agent which will effectively increase the amount of oil displaced from the subterranean formation. Typical examples of suitable polymers include polyacrylamides having from about 0 to about 75% of the amide groups hydrolyzed to carboxylate groups. It is preferred to have from about 0 to 30% of the amide group hydrolyzed to carboxylate groups. Especially preferred is a polyacrylamide of greater than 6 million molecular weight and approximately 5% of the amide groups hydrolyzed. Polysaccharides are also polymers useful in my invention. For example, a commercially available material is Kelzan MF (a xanthan gum produced by the action of the bacterium Xanthomonas campestris). Modifications of polysaccharides to increase their ionic character will make them even more useful in my invention.

Another type of polymer useful in my invention are water soluble starch derivatives containing carboxyl sulfonate or sulfate groups in the form of sodium or ammonium salts. Other useful polymers include but are not limited to soluble cellulose derivatives, polyvinyl alcohol, polyvinyl pyrrolidone, poly(acrylic acid), poly (ethylene oxide), polyethyleneimine and colloidal silica. This listing is not exhaustive. Various other polymers may be used without departing from the scope and spirit of my invention.

The amount of polymeric material which must be employed in the practice of any chemical flood is generally known in the art and is to be found in published literature. However, the slug size of polymer generally will range from about 0.1 to 2 pore volumes of an aqueous polymer solution having dissolved therein from about 0.01 to about 0.5 percent by weight of the polymer itself.

In my invention, the sacrificial agent is injected ahead of or in admixture with the polymeric material. A surfactant may be mixed with the sacrificial agent and/or the polymer.

One embodiment of my invention is the use of an aqueous solution of modified lignosulfonate in a slug ahead of or in admixture with an aqueous solution of polymer used to drive oil from an injection well to a production well.

In another embodiment of this invention, an aqueous solution of the sulfomethylated lignosulfonate is injected into the formation ahead of an aqueous surfactant solution also containing the sulfomethylated lignosulfonate followed by injection of an aqueous polymer solution.

In another embodiment of this invention, a sacrificial material comprising sulfomethylated lignosulfonate salts, is injected via the suitable injection means, i.e. through one or more injection wells completed in the subterranean hydrocarbon formation, in admixture with a surfactant solution followed by a solution of polymer. By injecting the sacrificial material and surfactant together followed by polymer oil recovery is maximized.

Another embodiment of my invention is the use of modified lignosulfonates in conjunction with an emulsion of water, hydrocarbon and surfactant, i.e., a micellar dispersion. The same parameters as discussed above for simple aqueous surfactant solutions would apply to micellar dispersions. Micellar dispersions are known in the art. See for example, U.S. Pat. No. 3,536,136 incorporated here by reference.

The sacrificial agents useful in the process of my invention are sulfomethylated lignosulfonate salts. Lignosulfonates are anionic polyelectrolytes soluble in water and tolerate hard water (polyvalent ions, e.g. calcium and magnesium). They are also thermally stable in formations where the temperature is high. Lignosulfonates are macromolecules built up by complex condensation of phenyl propane units. The sulfonate groups are attached to the aliphatic side chain, mainly to alpha carbon. Lignosulfonates are water soluble with molecular weights ranging from several thousand to around 50,000 or more. They are economically attractive since being by-products of the pulping industry, they are plentiful and cost less than either the surfactants or the polymers used in enhanced oil recovery methods. The polyelectrolyte lignosulfonates with strongly ionized sulfonate groups are negatively charged species and have a tendency to adsorb on solid surfaces thereby imparting a negative charge to them. The rock surfaces of a reservoir treated with lignosulfonate will be inert towards the anionic surfactants in the flood water and therefore loss of surfactants to the rock surfaces will be kept to a minimum. The same phenomenon will occur with the polymer thickened drive fluid.

Lignin is second only to cellulose as the principal constituent in wood. Generally, lignin is a complex phenolic polyether containing many different functional groups including carboxyls, carbonyls, and alcoholic and phenolic hydroxyls. Lignins and their derivatives are described in Kirk-Othmer Encyclopedia of Chemical Technology, Second Edition, Vol. 12, beginning at page 362. This publication describes two very broad classes of lignin derivatives: sulfite lignins and alkali lignins.

The difference in the lignins exists because of the method of extraction of lignin material from woody materials. Sulfonated alkali lignins are readily available commercially from various sources including but not limited to West Virginia Pulp and Paper Company under the trade name REAX. Their general method of preparation is described in the Encyclopedia of Chemical Technology referred to above. Briefly, sulfonated alkali lignins are prepared by cooking woodchips with a 10% solution of a mixture of sodium hydroxide with about 20 mole percent of sodium sulfide. The lignin with wood is modified into a sodium compound often termed sodium lignate or alkali lignin which is very soluble in the strongly alkaline solution. These alkali lignins are removed from solution by lowering the pH which precipitates out the alkali lignins. These unsulfonated alkali lignins are sold under various tradenames including INDULIN. These alkali lignins are used to prepare the sulfonated derivatives. Methods of sulfonation are known by those skilled in the art. One typical method involves treating the alkali lignins with a solution of alkali sulfites at elevated temperature and pressure. The degree of sulfonation may be controlled to provide a variety of sulfonated alkali lignins.

The other main type of lignin derivatives are called sulfite lignins or sulfite lignosulfonates. Sulfite lignins are generally made by cooking woodchips under pressure in a solution of sulfurous acid and calcium, magnesium, sodium or ammonium bisulfite. This process converts insoluble lignins to soluble lignosulfonic acid. The lignosulfonic acids or calcium, magnesium, sodium or ammonium salts of the lignosulfonic acids are available under various tradenames including MARASPERSE, LIGNOSITE, ORZAN, TORANIL, and RAYFLO.

The broad term lignosulfonates used herein refers to both sulfonated alkali lignins and sulfite lignosulfonates (sulfite lignins). These are distinct types of compounds as explained above. Since the alkali lignins require sulfonation after extraction of the material from woody products it is proper to call them sulfonated alkali lignins. Likewise since sulfite lignins emerge from the extraction process already sulfonated it is proper to refer to this class of materials as sulfite lignins or sulfite lignosulfonates.

My invention is the use of sulfonated alkali lignins and sulfite lignosulfonates, each modified by sulfomethylation. Lignosulfonates having degrees of sulfonation from about 2.0 to saturation are acceptable as starting materials for the sulfomethylated lignosulfonates of my invention. Cations which are acceptable include $Na^+$, $K^+$, $NH_4^+$, $Ca^{++}$, and $Mg^{++}$. The degree of sulfonation is the weight percentage of sulfonate ($SO_3^-$) compared to the total molecular weight.

Crude unmodified lignosulfonates may be made with either softwoods or hardwoods. Although having basically the same functional groups the crude unmodified softwood lignosulfonates have more sulfonate and hydroxyl groups than the crude unmodified hardwood lignosulfonates. Thus, in general, crude unmodified softwood lignosulfonates have better hard water ($Ca^{++}$, $Mg^{++}$) tolerance than the hardwood form.

Sulfomethylation of lignosulfonates resulting in sulfomethylated lignosulfonates may take place by various routes known to those skilled in the art. My invention is not limited to the use of products made by any specific route. Any route which adds the methylene sulfonate radical is acceptable. In one route, formaldehyde and a bisulfite salt is reacted with crude unmodified lignosulfonates under basic conditions to yield a product with additional sulfonate groups attached to the lignosulfonate through methylene groups. For example, sodium, potassium, calcium or magnesium bisulfites are useful. It is believed that these methylene sulfonate groups attach predominantly at the ortho sites of aryl groups in the lignosulfonate although some methylene sulfonate groups attach at the meta site.

The quantity of sulfomethylated lignosulfonates to be injected into the subterranean hydrocarbon formation may be any amount up to and including an amount sufficient to occupy substantially all of the active sites of the formation matrix. If less than the maximum amount is used, there will be a corresponding increase in the adsorption of surfactant and/or polymer from injection solution onto the formation matrix although the amount of increase will not be as great as in the case where the formation is completely free of sulfomethylated lignosulfonate salts. At a maximum, only the amount of modified lignosulfonate salts needed to completely occupy the active sites on the formation matrix is needed. The detriment resulting from using excess modified lignosulfonate salts would be an increase in the cost of operating the oil recovery program.

The amount of sulfomethylated lignosulfonate salts needed in the process of the invention depends on the particular formation, the area or pattern to be swept and other formation characteristics. Those skilled in the art can determine the exact quantity needed to afford the desired amount of protection.

Generally it has been found that the amount of sulfomethylated lignosulfonate in the chemical (polymeric) slug will be effective in amounts of from about 0.1 to about 5 percent by weight of the total polymeric solution.

The following examples demonstrate the performance of modified lignosulfonates in oil recovery from crushed limestone packs or sand packs in the laboratory. In those tests the packs were saturated with oil and then water flooded to a residual oil saturation. Then surfactant solutions were injected followed by polymer solutions.

EXAMPLE I

OIL RECOVERY FROM CRUSHED LIMSTONE PACKS

Surfactant
System:  0.4% Dodecylbenzene sulfonate + 0.6%
Sulfonated 4 mole EO adduct of nonyl phenol
+ 1.0% Lignosulfonate in 65,000 ppm TS brine
Polymer: 0.1% Polysaccharide polymer B-1459 in
65,000 ppm TDS brine % Pore

-continued

OIL RECOVERY FROM CRUSHED LIMSTONE PACKS

| Sulfomethylated Lignosulfonates | % Pore Volume Surfactant Injected | Volume Polymer Injected | % Tertiary Oil Recovery |
|---|---|---|---|
| None | 20 | 50 | 62.8 |
| Marasperse BS-22-3 (Sulfomethylated Na salt) | 20 | 50 | 91.0 |
| Marasperse 22 S-Z (sulfomethylated and oxidized Na salt) | 20 | 50 | 88.6 |

EXAMPLE II

Surfactant System: 1% Sulfated 4 mole EO adduct of nonyl phenol + 1% Lignosulfonate in 180,000 ppm TDS brine
Polymer: 0.1% Polysaccharide polymer B-1459 in 180,000 ppm TDS brine

| Sulfomethylated Lignosulfonates | % Pore Volume Surfactant Injected | % Pore Volume Polymer Injected | % Tertiary Oil Recovery |
|---|---|---|---|
| None | 15 | 50 | 60.0 |
| Marasperse BS-22-6 (sulfomethylated Na salt) | 15 | 50 | 76.7 |
| Marasperse 22S-Z (Sulfomethylated and oxidized Na salt) | 15 | 50 | 79.4 |
| Norlig 41S-2Z (sulfomethylated and oxidized Ca salt) | 15 | 50 | 73.0 |

EXAMPLE III

OIL RECOVERY FROM DOG LAKE SAND PACKS

Surfactant System: 2.0% Petroleum sulfonate + 0.6% sulfonated 6 mole EO adduct nonyl phenol + 1% Lignosulfonate in 105,000 ppm TDS brine
Polymer: 0.1% Polysaccharide polymer B-1459

| Sulfomethylated and Carboxylated Lignosulfonate | % Pore Volume Surfactant Injected | % Pore Volume Polymer Injected | % Tertiary Oil Recovery |
|---|---|---|---|
| None | 25 | 100 | 65.8 |
| Norlig 42SCAA Na salt, hardwood sulfomethylated then reacted with chloroacetic acid | 25 | 100 | 82.1 |

EXAMPLE IV

OIL RECOVERY FROM DOG LAKE SAND PACKS

Surfactant System: 2.0% Petroleum sulfonate + 0.6% sulfonated 6 mole EO adduct of nonyl phenol + 1% Lignosulfonate in 105,000 ppm TDS brine
Polymer: 0.1% Polysaccharide polymer B-1459

| Carboxylated Lignosulfonate | % Pore Volume Surfactant Injected | % Pore Volume Polymer Injected | % Tertiary Oil Recovery |
|---|---|---|---|
| None | 25 | 100 | 65.8 |
| Norlig 92CAA Na salt, softwood carboxylated with chloroacetic acid | 25 | 100 | 80.0 |

EXAMPLE V

OIL RECOVERY FROM DOG LAKE SAND PACKS

Surfactant System: 2.0% Petroleum sulfonate + 0.6% sulfonated 6 mole EO adduct of nonyl phenol + 1% Lignosulfonate in 105,000 ppm TDS brine
Polymer: 0.1% Polysaccharide polymer B-1459

| Oxidized and Carboxylated Lignosulfonate | % Pore Volume Surfactant Injected | % Pore Volume Surfactant Injected | % Tertiary Oil Recovery |
|---|---|---|---|
| None | 25 | 100 | 64.5 |
| Norlig 42ZCAA Na salt, Hardwood oxidized then carboxylated with chloroacetic acid | 25 | 100 | 84.1 |

I claim:

1. A method for recovering oil from a subterranean formation containing oil and having an injection well and a production well wherein aqueous solutions of surfactant and polymer are injected into the subterranean formation wherein the polymer increases the viscosity of the solution comprising:
   (a) injecting through the injection well into the formation an aqueous solution of sulfomethylated lignosulfonates,
   (b) then injecting into the formation via the injection well an aqueous surfactant solution also containing sulfomethylated lignosulfonates said sulfomethylated lignosulfonates of steps (a) and (b) being present in amounts effective for reducing the extent of adsorption of surfactant and polymer by the formation matrix,
   (c) subsequently injecting into the formation via the injection well an aqueous solution of polymer wherein the polymer increases the viscosity of the solution and
   (d) producing oil from the formation via the production well.

2. A method for recovering oil from a subterranean formation containing oil and having an injection well and a production well wherein aqueous solutions of surfactant and polymer are injected into the subterranean formation wherein the polymer increases the viscosity of the solution comprising:
   (a) injecting into the formation via the injection well an aqueous surfactant solution containing sulfomethylated lignosulfonates said sulfomethylated lignosulfonates being present in an amount effective for reducing the extent of adsorption of surfactant and polymer by the formation matrix,
   (b) subsequently injecting into the formation via the injection well an aqueous solution of said polymer and
   (c) producing oil from the formation via the production well.

3. A method for recovering oil from a subterranean formation containing oil and having an injection well and a production well comprising:
   (a) injecting through the injection well into the formation an aqueous solution of polymer wherein the polymer increases the viscosity of the solution and sulfomethylated lignosulfonates in an amount effective for reducing the extent of adsorption of polymer by the formation matrix and
   (b) producing oil from the formation via the production well.

4. A method for recovering oil from a subterranean formation containing oil and having an injection well and a production well comprising:
   (a) injecting through the injection well an aqueous solution of sulfomethylated lignosulfonates,
   (b) then injecting through the injection well an aqueous solution of polymer wherein the polymer increases the viscosity of the solution and
   (c) producing oil from the formation via the production well.

* * * * *